(12) United States Patent
Park et al.

(10) Patent No.: US 10,659,545 B2
(45) Date of Patent: May 19, 2020

(54) METHOD AND SYSTEM FOR PROVIDING PERSONALIZED NOTIFICATION WITHIN CONTENTS SERVICE

(71) Applicant: NAVER WEBTOON Corporation, Seongnam-si (KR)

(72) Inventors: Jieun Park, Seongnam-si (KR); Seung Ik Kim, Seongnam-si (KR); Changguen Song, Seongnam-si (KR)

(73) Assignee: NAVER WEBTOON CORPORATION, Seongnam-si (KR)

( * ) Notice: Subject to any disclaimer, the term of this patent is extended or adjusted under 35 U.S.C. 154(b) by 159 days.

(21) Appl. No.: 15/408,905

(22) Filed: Jan. 18, 2017

(65) Prior Publication Data

US 2017/0223126 A1    Aug. 3, 2017

(30) Foreign Application Priority Data

Jan. 29, 2016    (KR) .................. 10-2016-0011490

(51) Int. Cl.
*G06F 15/16* (2006.01)
*H04L 29/08* (2006.01)
*H04L 12/58* (2006.01)

(52) U.S. Cl.
CPC .............. *H04L 67/26* (2013.01); *H04L 51/12* (2013.01); *H04L 51/24* (2013.01); *H04L 67/22* (2013.01); *H04L 51/16* (2013.01); *H04L 51/34* (2013.01)

(58) Field of Classification Search
CPC ......... H04L 67/26; H04L 51/12; H04L 51/24; H04L 51/16; H04L 51/34; H04L 67/22
USPC ....................................................... 709/206
See application file for complete search history.

(56) References Cited

U.S. PATENT DOCUMENTS

| 9,367,227 | B1* | 6/2016 | Kim | G06F 3/04883 |
| 2008/0091931 | A1* | 4/2008 | McNutt | G05B 19/054 |
| | | | | 713/1 |
| 2015/0006258 | A1* | 1/2015 | Salama | G06Q 30/0206 |
| | | | | 705/7.35 |
| 2015/0172764 | A1* | 6/2015 | Chae | H04N 21/4668 |
| | | | | 725/9 |
| 2015/0312609 | A1* | 10/2015 | Hoctor | H04N 21/251 |
| | | | | 725/14 |

(Continued)

FOREIGN PATENT DOCUMENTS

| CN | 103460769 A | 12/2013 |
| CN | 104735477 A | 6/2015 |

(Continued)

OTHER PUBLICATIONS

Taiwanese Office Action dated Apr. 25, 2018 by the Taiwanese Patent Office corresponding to Taiwanese patent application No. 106102996.

(Continued)

*Primary Examiner* — Sm A Rahman
(74) *Attorney, Agent, or Firm* — Greer Burns & Crain Ltd.

(57) ABSTRACT

Provided is a method and system for providing a personalized notification in a content service. The notification providing method includes selecting notification target content by analyzing a user utilization record of content with respect to a user that consumes the content; and sending a push notification associated with the notification target content to the user as a personalized notification.

11 Claims, 13 Drawing Sheets

(56) References Cited

U.S. PATENT DOCUMENTS

2016/0014461 A1* 1/2016 Leech ............... H04N 21/4668
725/14

FOREIGN PATENT DOCUMENTS

| JP | 2006023857 A | 1/2006 |
|----|--------------|--------|
| JP | 2006139430 A | 6/2006 |
| JP | 2016004392 A | 1/2016 |
| KR | 20110123393 A | 11/2011 |
| KR | 20110134655 A | 12/2011 |
| KR | 10-2012-0043434 | 5/2012 |
| KR | 10-2014-0015460 | 2/2014 |
| KR | 20140015460 A | 6/2014 |
| KR | 10-2015-0020390 | 2/2015 |

OTHER PUBLICATIONS

Korean Office Action issued by the Korean Patent Office in corresponding to Korean patent application No. 10-2017-0084293, dated Jul. 20, 2017.

Korean Office Action dated Aug. 31, 2018 by the Korean Patent Office corresponding to Korean patent application No. 10-2018-0091119.

Japanese Office Action dated Jan. 9, 2018 by the Japanese Patent Office corresponding to Japanese patent application No. 2017-11009.

Chinese Office Action dated Aug. 1, 2019 by the Chinese Patent Office corresponding to Chinese patent application No. 201710022691.9.

* cited by examiner

FIG. 6

Example of notification case 1 (Based on check time Monday 00:00:00)

| Recently read webtoons (40 episodes) | Registered as webtoon of interest | Update day | Number of read episodes (among 40 episodes) | Number of remaining episodes for each webtoon | Last reading time | Whether to send notification |
|---|---|---|---|---|---|---|
| A | × | Mon, Wed | 20 | 1 | 2015/12/02 00:36:15 | ○ |
| B | × | Tue | 5 | 0 | 2015/12/03 00:11:15 | × |
| C | × | Mon, Fri | 5 | 2 | 2015/12/03 00:10:15 | × |
| D | ○ | Mon | 5 | 1 | 2015/12/02 00:06:15 | × |
| E | × | Mon | 3 | 1 | 2015/09/30 00:36:15 | × |
| F | × | Mon | 1 | 2 | 2015/08/02 00:36:15 | × |
| G | × | Mon | 1 | 0 | 2015/11/30 00:36:15 | × |

FIG. 7

Example of notification case 2 (Based on check time Monday 00:00:00)

| Recently read webtoons (40 episodes) | Registered as webtoon of interest | Update day | Number of read episodes (among 40 episodes) | Number of remaining episodes for each webtoon | Last reading time | Whether to send notification |
|---|---|---|---|---|---|---|
| A | × | Mon, Wed | 20 | 0 | 2015/12/02 00:36:15 | × |
| B | × | Tue | 5 | 0 | 2015/12/03 00:11:15 | × |
| C | × | Mon, Fri | 5 | 2 | 2015/12/03 00:10:15 | × |
| D | × | Mon | 5 | 1 | 2015/12/02 00:06:15 | ○ |
| E | × | Mon | 3 | 1 | 2015/09/30 00:36:15 | × |
| F | × | Mon | 1 | 2 | 2015/08/02 00:36:15 | × |
| G | × | Mon | 1 | 0 | 2015/11/30 00:36:15 | × |

FIG. 8

Example of notification case 3 (Based on check time Monday 00:00:00)

| Recently read webtoons (40 episodes) | Registered as webtoon of interest | Update day | Number of read episodes (among 40 episodes) | Number of remaining episodes for each webtoon | Last reading time | Whether to send notification |
|---|---|---|---|---|---|---|
| A | × | Mon, Wed | 20 | 0 | 2015/12/02 00:36:15 | × |
| B | × | Tue | 5 | 0 | 2015/12/03 00:11:15 | × |
| C | × | Mon, Fri | 5 | 1 | 2015/12/03 00:10:15 | ○ |
| D | × | Mon | 5 | 1 | 2015/12/02 00:06:15 | × |
| E | × | Mon | 3 | 1 | 2015/09/30 00:36:15 | × |
| F | × | Mon | 1 | 2 | 2015/08/02 00:36:15 | × |
| G | × | Mon | 1 | 0 | 2015/11/30 00:36:15 | × |

FIG. 9

Example of notification case 4 ((Based on check time +1 week Monday 00:00:00)

| Recently read webtoons (40 episodes) | Last week notification feedback | Registered as webtoon of interest | Update day | Number of read episodes (among 40 episodes) | Number of remaining episodes for each webtoon | Last reading time | Whether to send notification |
|---|---|---|---|---|---|---|---|
| A | - | × | Mon, Wed | 20 | 0 | 2015/12/02 00:36:15 | × |
| B | - | × | Tue | 5 | 0 | 2015/12/03 00:11:15 | × |
| C | × | × | Mon, Fri | 5 | 1 | 2015/12/03 00:10:15 | × |
| D | - | × | Mon | 5 | 1 | 2015/12/02 00:06:15 | ○ |
| E | - | × | Mon | 3 | 1 | 2015/09/30 00:36:15 | × |
| F | - | × | Mon | 1 | 2 | 2015/08/02 00:36:15 | × |
| G | - | × | Mon | 1 | 0 | 2015/11/30 00:36:15 | × |

FIG. 13
<Remind notification>
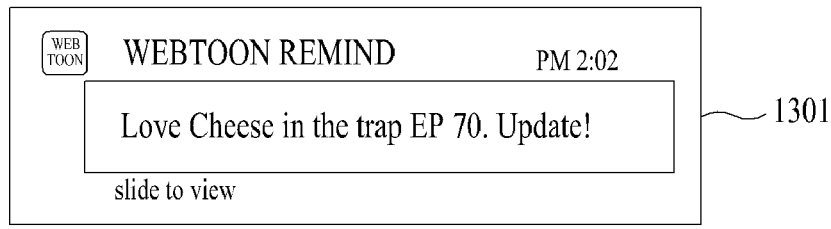
1301
<New content notification associated with preferred genre>
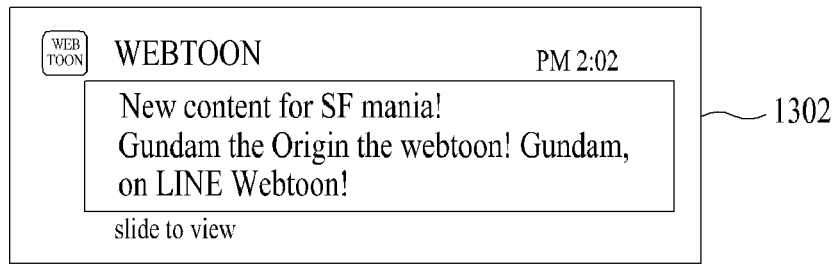
1302
<New content notification associated with genre of interest>
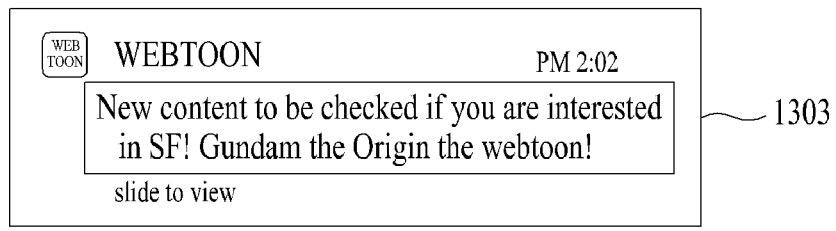
1303
<New content notification associated with popular genre>
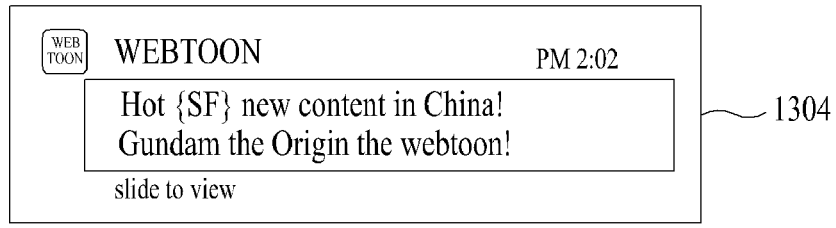
1304

METHOD AND SYSTEM FOR PROVIDING PERSONALIZED NOTIFICATION WITHIN CONTENTS SERVICE

CROSS-REFERENCE TO RELATED APPLICATION(S)

This application claims priority under 35 U.S.C. § 119 to Korean Patent Application No. 10-2016-0011490 filed on Jan. 29, 2016, in the Korean Intellectual Property Office (KIPO), the entire contents of which are incorporated herein by reference.

BACKGROUND

Field

One or more example embodiments of the invention relate to technology for providing digital formatted contents through the Internet.

Description of Related Art

A rapid increase in a number of users of ultra high speed communication networks has enabled the development of new services and diversification of service items through these communication networks. Currently, with the appearance of various image-based services, a cartoon service is used by many users as one of representative services using the communication networks.

In general, a cartoon refers to a picture that is simply and comically drawn or exaggerates and thereby represents an appearance of, for example, a person, an animal, a thing, and the like. The cartoon provides a reading by containing humor, satire, or a desired story using short sentences.

In recent times, with the release of online cartoons, many users acquire fun and information by reading the cartoons. An online cartoon providing system generally allows members to read a cartoon based on an authentication result in response to authentication processing. The authenticated users may further easily read a cartoon by selecting the cartoon and selecting an automatic page turning function or a passive page turning function.

For example, Korean Patent Publication No. 10-2011-0123393, published on Nov. 15, 2011, discloses technology for providing a cartoon in a mobile digital content form through online direct dealing.

SUMMARY

One or more example embodiments provide a method and system that provides a personalized push notification by analyzing a user utilization record of content.

One or more example embodiments also provide a method and system that provides a remind notification associated with content that a user has forgotten to read.

One or more example embodiments also provide a method and system that provides a notification associated with new content based on a user preference or a language selection of a user.

According to an aspect of at least one example embodiment, there is provided a notification providing method executed by a computer. The method includes selecting notification target content by analyzing a user utilization record of content with respect to a user that consumes the content; and sending a push notification associated with the notification target content to the user as a personalized notification. The content is a serial plan that includes a plurality of episodes, and the selecting includes selecting a portion of contents consumed by the user as the notification target content based on episode information for each piece of content consumed by the user.

The selecting may include filtering contents recently consumed by the user based on a unit period; filtering specific content that includes a largest number of episodes read by the user or an episode read by the user a first set number of times or more among the contents; verifying a remaining episode unread by the user in the specific content; and selecting the specific content as the notification target content in response to a number of remaining episodes being greater than or equal to a second set number of times.

The selecting may include selecting content that includes a smallest number of remaining episodes from among a plurality of specific contents as the notification target content in response to a presence of the plurality of specific contents.

The selecting may include selecting content most recently read by the user from among a plurality of specific contents in response to a presence of the plurality of specific contents and a number of remaining episodes being identical for all of the specific contents.

The selecting may include excluding at least one of content registered by the user as a target of interest and content having a different update period from among the contents.

The sending may include sending a remind notification associated with the specific content selected as the notification target content, and the selecting may include verifying a user reaction to the specific content after the remind notification is sent; and excluding the specific content from among contents to be filtered in a subsequent unit period, in response to an absence of the user reaction.

The selecting may include selecting a portion of newly registered contents as the notification target content based on at least one of genre information for each piece of content consumed by the user and language information or geographic region information of the user.

The selecting may include filtering contents recently consumed by the user in response to new content being registered; verifying a first genre most frequently consumed by the user based on the contents; and selecting the new content as the first notification content in response to a genre of the new content being identical to the first genre.

The selecting may include verifying a second genre consumed by the user a set number of times or more among the contents in response to the genre of the new content being different from the first genre; and selecting the new content as second notification target content in response to the genre of the new content being identical to the second genre.

The selecting may include verifying a popular genre in a language group corresponding to language information or geographic region information of the user; and selecting the new content as third notification target content in response to the genre of the new content being identical to the popular genre.

The sending may include classifying a message type based on the notification target content, and sending a push notification of a type corresponding to the notification target content.

The sending may include pushing each of a remind notification associated with content of which consumption of the user is stopped and a new content notification associated with newly registered content as a push notification of a different message type.

The sending may include sending each of a new content notification associated with a preferred genre of the user as a new content notification associated with newly registered content, a new content notification associated with a genre of interest of the user, and a new content notification of a popular genre in a language group of the user as a push notification of a different message type.

According to another aspect of at least one example embodiment, there is provided a non-transitory computer-readable recording medium storing a computer program to implement a notification providing method in conjunction with an electronic device configured as a computer. The notification providing method includes selecting notification target content by analyzing a user utilization record of content with respect to a user that consumes the content; and sending a push notification associated with the notification target content to the user as a personalized notification, and the content is a serial plan that includes a plurality of episodes, and the selecting includes selecting a portion of contents consumed by the user as the notification target content based on episode information for each piece of content consumed by the user.

According to another aspect of at least one example embodiment, there is provided a notification providing system configured as a computer. The notification providing system includes a selector configured to select notification target content by analyzing a user utilization record of content with respect to a user that consumes the content; and a notification sender configured to send a push notification associated with the notification target content to the user as a personalized notification. The content is a serial plan that includes a plurality of episodes, and the selector is further configured to select a portion of contents consumed by the user as the notification target content based on episode information for each piece of content consumed by the user.

The selector may be further configured to select a portion of newly registered contents as the notification target content based on at least one of genre information for each piece of content consumed by the user and language information or geographic region information of the user.

The selector may be further configured to filter contents recently consumed by the user based on a unit period, filter specific content that includes a largest number of episodes read by the user or an episode read by the user a first set number of times or more among the contents, and select the specific content as the notification target content in response to a number of remaining episodes unread by the user in the specific content being greater than or equal to a second set number of times, and the notification sender may be further configured to send a remind notification associated with the specific content selected as the notification target content.

The selector may be further configured to select content that includes a smallest number of remaining episodes from among a plurality of specific contents in response to a presence of the plurality of specific contents, and select content most recently read by the user among the plurality of specific contents as the notification target content in response to the presence of the plurality of specific contents and a number of remaining episodes being identical for all of the specific contents.

The selector may be further configured to filter contents recently read by the user in response to new content being registered, verify a first genre most frequently consumed by the user based on the contents, select the new content as first notification target content in response to a genre of the new content being identical to the first genre, verify a second genre consumed by the user a set number of times or more among the contents in response to the genre of the new content being different from the first genre, select the new content as second notification target content in response to the genre of the new content being identical to the second genre, and send a push notification associated with the first notification target content and the second notification target content to the user as a personalized notification.

The selector may be further configured to verify a popular genre in a language group corresponding to language information or geographic region information of the user in response to an absent of content recently consumed by the user or a number of contents recently consumed by the user being less than a set number, or in response to the genre of the new content being different from the second genre, and select the new content as third notification target content in response to the genre of the new content being identical to the popular genre.

According to some example embodiments, it is possible to enhance user accessibility to content and to reduce resources or processing cost used for providing content by analyzing a user utilization record of the content and by automatically providing the content desired by the user through a personalized push notification.

Also, according to some example embodiments, since a remind notification is provided to a user for content that the user has recently forgotten to read among contents being used by the user such that the user may directly enter, that is, connect to the corresponding content, it is possible to activate the user influx and the content consumption by reminding the user of the user's interest on the content.

Also, according to some example embodiments, it is possible to effectively provide a content notification to users having a relatively high actual consumption probability by providing an automatic push notification based on a user preference or a language selection with respect to new content.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein:

FIGS. 6 through 9 illustrate examples of a notification case according to at least one embodiment;

FIG. 13 illustrates examples of a notification message type according to at least one embodiment.

Figure 1:
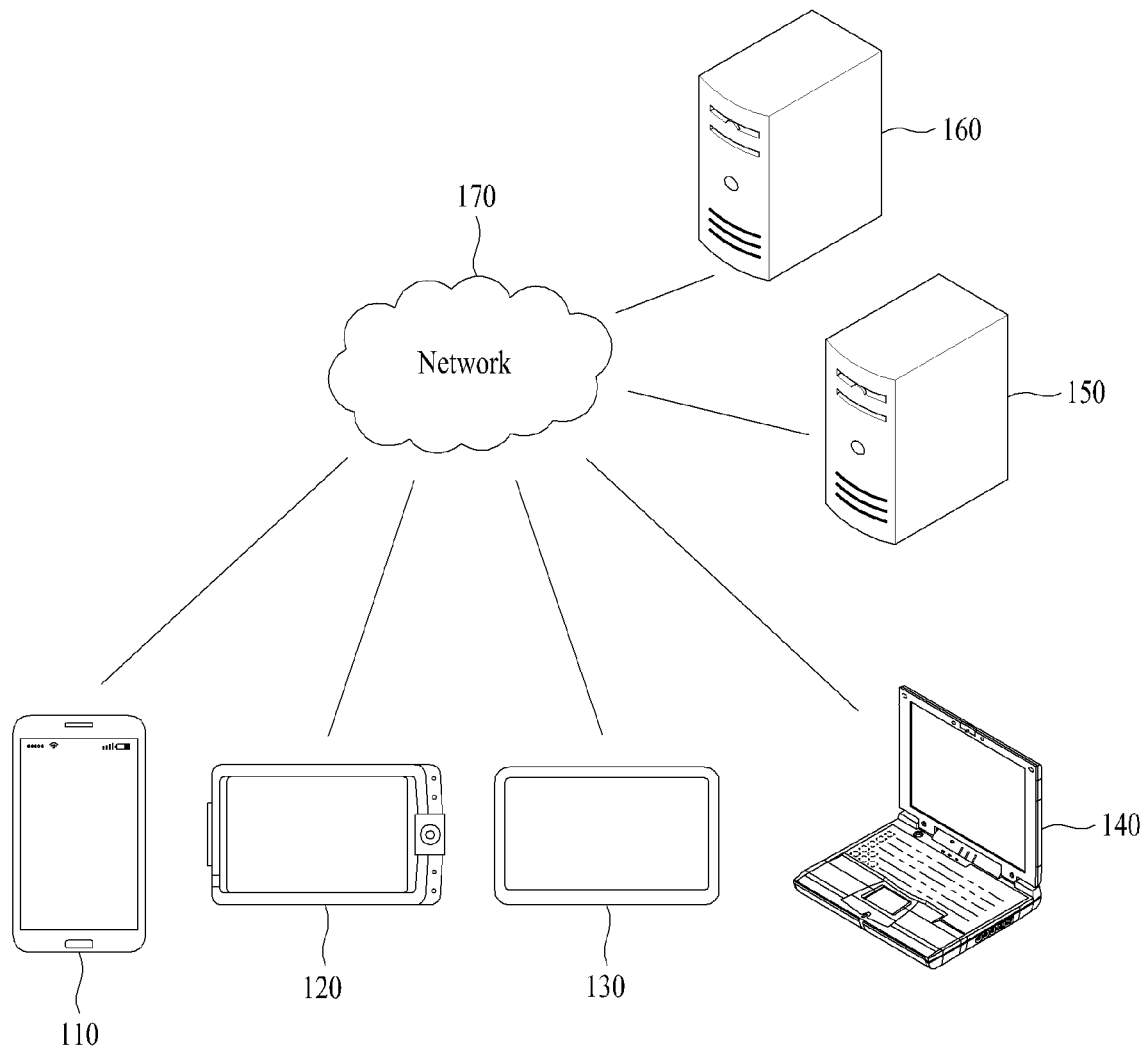
FIG. 1 is a diagram illustrating an example of a network environment according to at least one embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for providing digital formatted content through the Internet, and more particularly, to technology for providing a push notification for connecting to content. As known in the art, a push notification is the delivery of information or content from a server to a computing device without a specific request from the client.

FIG. 1 is a diagram illustrating an example of a network environment according to at least one embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a personal computer (PC), a laptop computer, a smartphone, a tablet, a wearable computer, navigation, a digital broadcasting terminal, a personal digital assistant (PDA), a portable multimedia player (PMP), and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, and a broadcasting network, which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, file, contents, services, and the like through communication with the plurality of electronic devices 110, 120, 130, and/or 140 over the network 170. Examples of a server computer may include a server computing device, a PC, a server computer, series of server computers, a mini computer, and/or a main frame computer, however, are not limited thereto. The server computer may be a distributive system, and operations of the server computer may be executed simultaneously and/or sequentially on one or more processors.

For example, the server 150 serves as a content service platform that provides digital formatted content, for example, a webtoon, etc., to the electronic device 110 that is a client. In particular, the server 150 may provide a personalized push notification associated with content by analyzing a user utilization record within a content service.

As another example, the server 160 may provide a file for installing an application to the electronic device 110 connected over the network 170. In this case, the electronic device 110 may install the application using the file provided from the server 160.

The server 160 may connect to the server 150 under control of at least one program, for example, a browser or the installed application, and an operating system (OS) included in the electronic device 110, and may use a service or content provided from the server 150. For example, in response to a service request message transmitted from the electronic device 110 to the server 150 over the network 170 under control of the application, the server 150 may transmit a code corresponding to the service request message to the electronic device 110, and the electronic device 110 may provide content to the user by configuring and displaying a screen corresponding to the code under control of the application.

Figure 2:
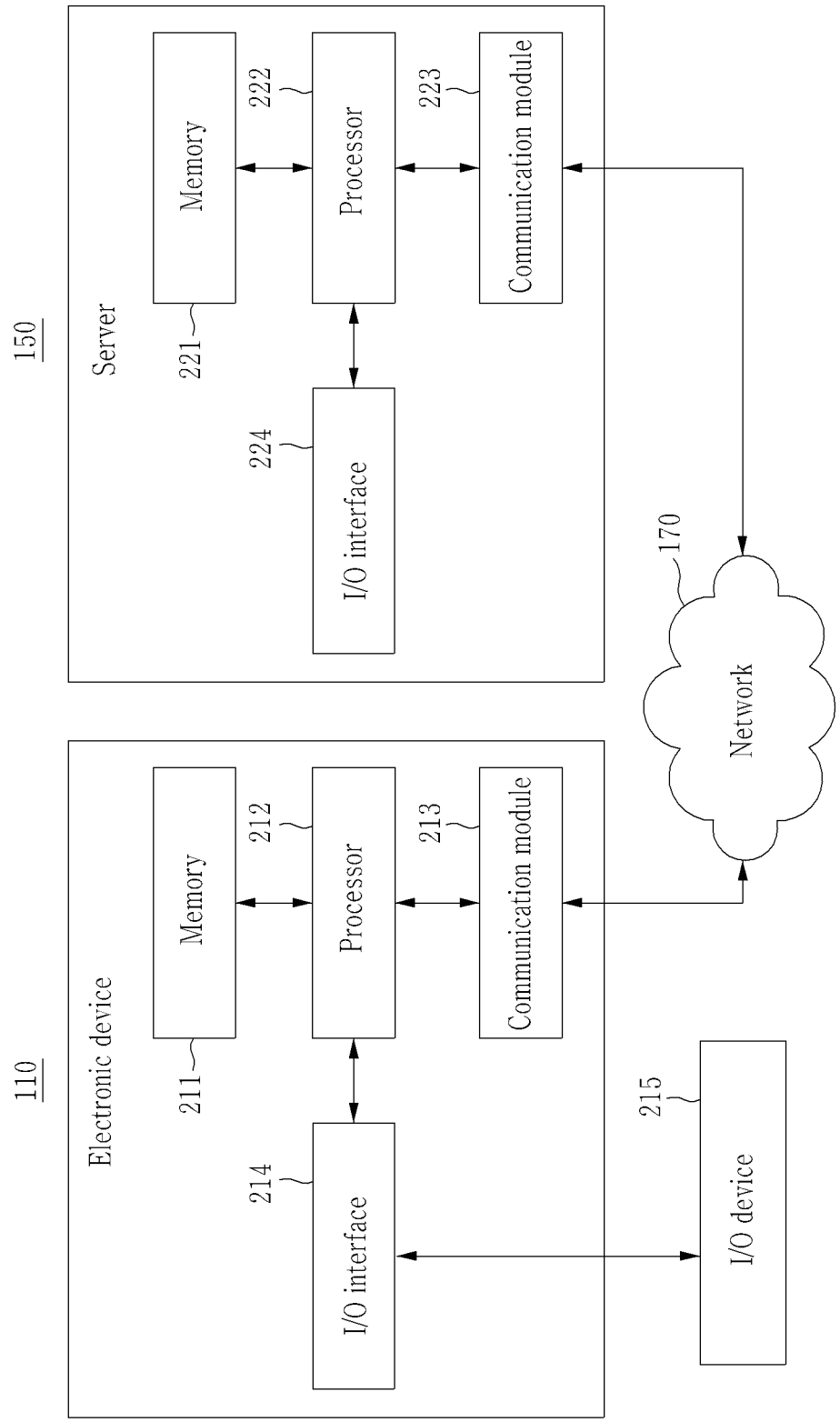
FIG. 2 is a block diagram illustrating an example of a configuration of an electronic device and a server according to at least one embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar constituent elements may be applicable to other electronic devices 120, 130, and/or 140, or the server 160, and also to still other electronic devices or still other servers.

Referring to FIG. 2, the electronic device 110 includes a memory 211, a processor 212, a communication module 213, and an input/output (I/O) interface 214, and the server 150 includes a memory 221, a processor 222, a communication module 223, and an I/O interface 224. The memory 211, 221 may include a permanent mass storage device, such as random access memory (RAM), read only memory (ROM), a disk drive, etc., as a computer-readable storage medium. Also, an OS and at least one program code, for example, the aforementioned code for browser or the application installed and executed on the electronic device 110, may be stored in the memory 211, 221. Such software constituent elements may be loaded from another computer-readable storage medium separate from the memory 211, 221 using a drive mechanism. The other computer-readable storage medium may include, for example, a floppy drive, a disk, a tape, a DVD/CD-ROM drive, a memory card, etc. According to other example embodiments, software constituent elements may be loaded to the memory 211, 221 through the communication module 213, 223, instead of, or in addition to, the computer-readable storage medium. For example, at least one program may be loaded to the memory 211, 221 based on a program, for example, the application, installed by files provided over the network 170 from developers or a file distribution system, for example, the server 160, which provides an installation file of the application.

The processors 212, 222 are configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 222.

The communication modules 213, 223 provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214 is a device used for interfacing with an I/O device 215. For example, an input device may include a keyboard, a mouse, etc., and an output device may include a device, such as a display for displaying a communication session of an application. As another example, the I/O interface 214 may be a device for interfacing with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. However, there is no need to clearly illustrate many constituent elements according to the related art. For example, the electronic device 110 may include at least a portion of the I/O device 215, or may further include other constituent elements, for example, a transceiver, a global positioning system (GPS) module, a camera, a variety of sensors, a database, and the like.

Herein, the term 'content' includes a webtoon, a moving picture, a photo, an image, music, a document, and the like, and may inclusively indicate various types of information produced and distributed using a digital scheme or the content thereof.

Figure 3:
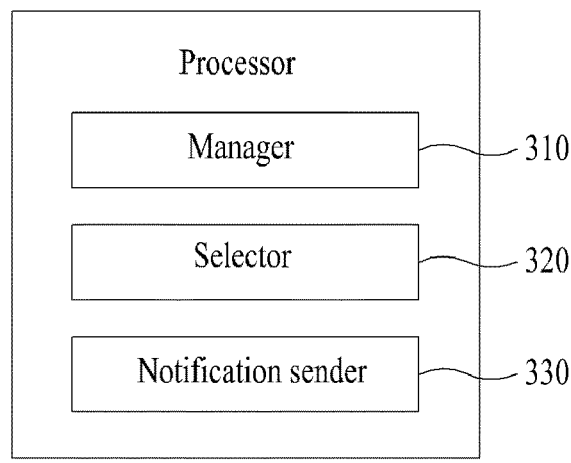
FIG. 3 is a diagram illustrating an example of constituent elements includable in a processor of a server according to at least one embodiment.
Figure 4:
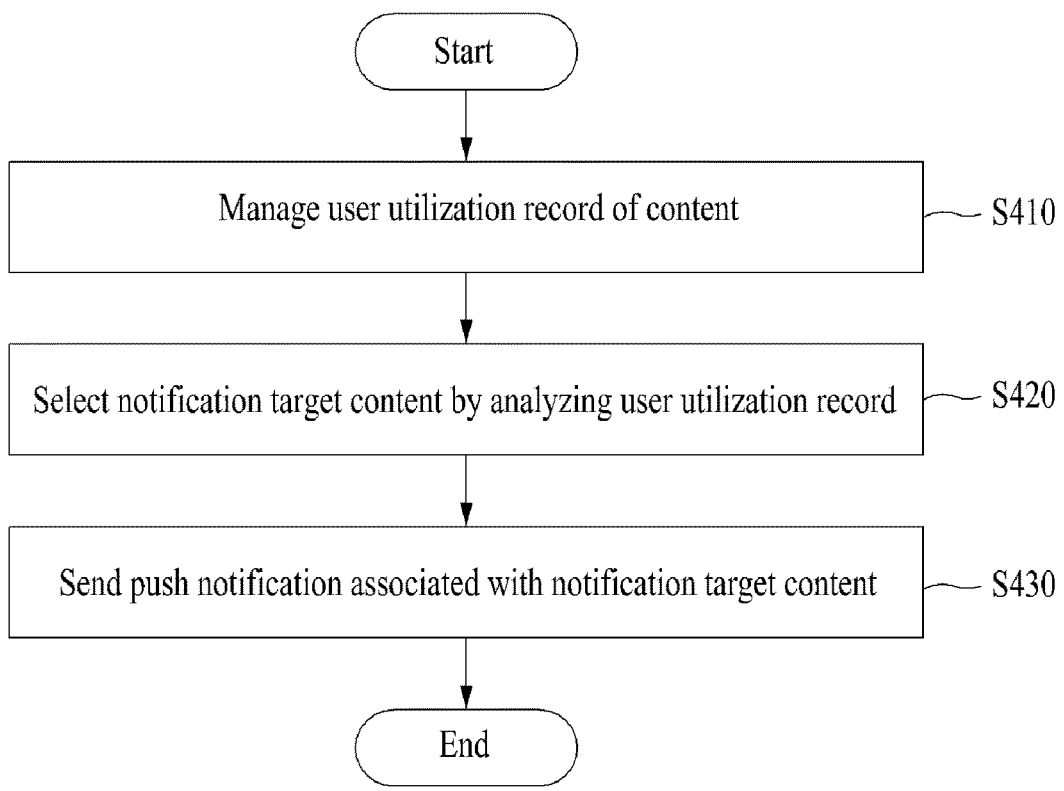
FIG. 4 is a flowchart illustrating an example of a method performed at a server according to at least one embodiment.

FIG. 3 is a diagram illustrating an example of constituent elements includable in a processor of a server according to at least one example embodiment, and FIG. 4 is a flowchart illustrating an example of a method performed at a server according to at least one example embodiment. Referring to FIG. 3, the processor 222 of the server 150 includes a number of functional units including manager 310, a selector 320, and a notification sender 330, which are configured to perform predefined operations. The constituent elements of the processor 222 may control the server 150 to perform operations S410 through S430 of FIG. 4, and to this end, may be configured to execute a code of at least one program and an OS included in the memory 221.

In operation S410, the manager 310 manages a user utilization record of content with respect to a user that uses a content service. Content provided from the content service may indicate a serial plan that includes a plurality of episodes, such as a series. For example, the manager 310 may store and manage a user utilization record of each user on the server 150 as a database. As another example, an application installed on the electronic device 110 and associated with the content service may store the user utilization record of content. Here, the manager 310 may receive the user utilization record from the electronic device 110. The user utilization record may include information about contents consumed by the user during a recent unit period, for example, 1 week. For example, the user utilization record may include a list of contents recently consumed by the user, episode information and genre information or category information for each of the contents recently consumed by the user, time information, and the like. The user utilization record may include setting information associated with a content utilization, for example, language selection or geographic region information of the user associated with content utilization, a preferred genre, a non-preferred genre, and the like.

In operation S420, the selector 320 selects notification target content by analyzing the user utilization record. The notification target content may be selected based on the user utilization record of each user. For example, the selector 320 may analyze the user utilization record, and may filter content that has been continuously consumed by the user and the consumption of which has stopped. The selector 320 may select a portion of contents consumed by the user as a remind notification target based on episode information for each piece of content consumed by the user. Here, the selector 320 may filter the notification target content based on a number of episodes read by the user, a number of episodes unread by the user, a user reading time, and the like. As another example, the selector 320 may filter content corresponding to a user preference or a language selection, for example, content of a genre recently preferred by the user, content of a genre popular in a language group of the user, and the like. Here, the selector 320 may filter the notification target content based on a preferred genre or a non-preferred genre of the user, a popular genre for each selected language, a popular language for each region, and the like. That is, the selector 320 may select a portion of newly registered contents as a new content notification target based on at least one of genre information for each piece of content consumed by the user and language information or geographic region information of the user.

In operation S430, the notification sender 330 sends a push notification associated with the notification target content to the user. A notification may be sent in a form of a message that includes a path capable of directly connecting to the content. For example, the notification sender 330 may provide a remind notification associated with content that has been continuously consumed by the user and the consumption of which has stopped. Here, in response to updating of the content corresponding to the notification target content, the notification sender 330 may provide a notification associated with the corresponding content to the user. As another example, in response to registering of new content, the notification sender 330 may provide a new content notification to the user. If a genre of the new content is identical to a genre of the notification target content, the notification sender 330 may provide a notification associated with the corresponding new content. The notification sender 330 may determine a message type based on the notification target content and may send a notification of the determined message type. That is, the notification sender 330 may send a push notification by classifying the message type into a remind notification and a new content notification. For example, the notification sender 330 may provide each of new content of a genre most frequently read by the user, new content of a genre read by the user a desired (or, alternatively, predetermined) number of times or more, new content of a genre popular in a language group of the user, and the like, using a push notification of a different message type.

Hereinafter, example embodiments will be described by employing a webtoon as a representative example of content, however, the types of content are not limited thereto.

Figure 5:
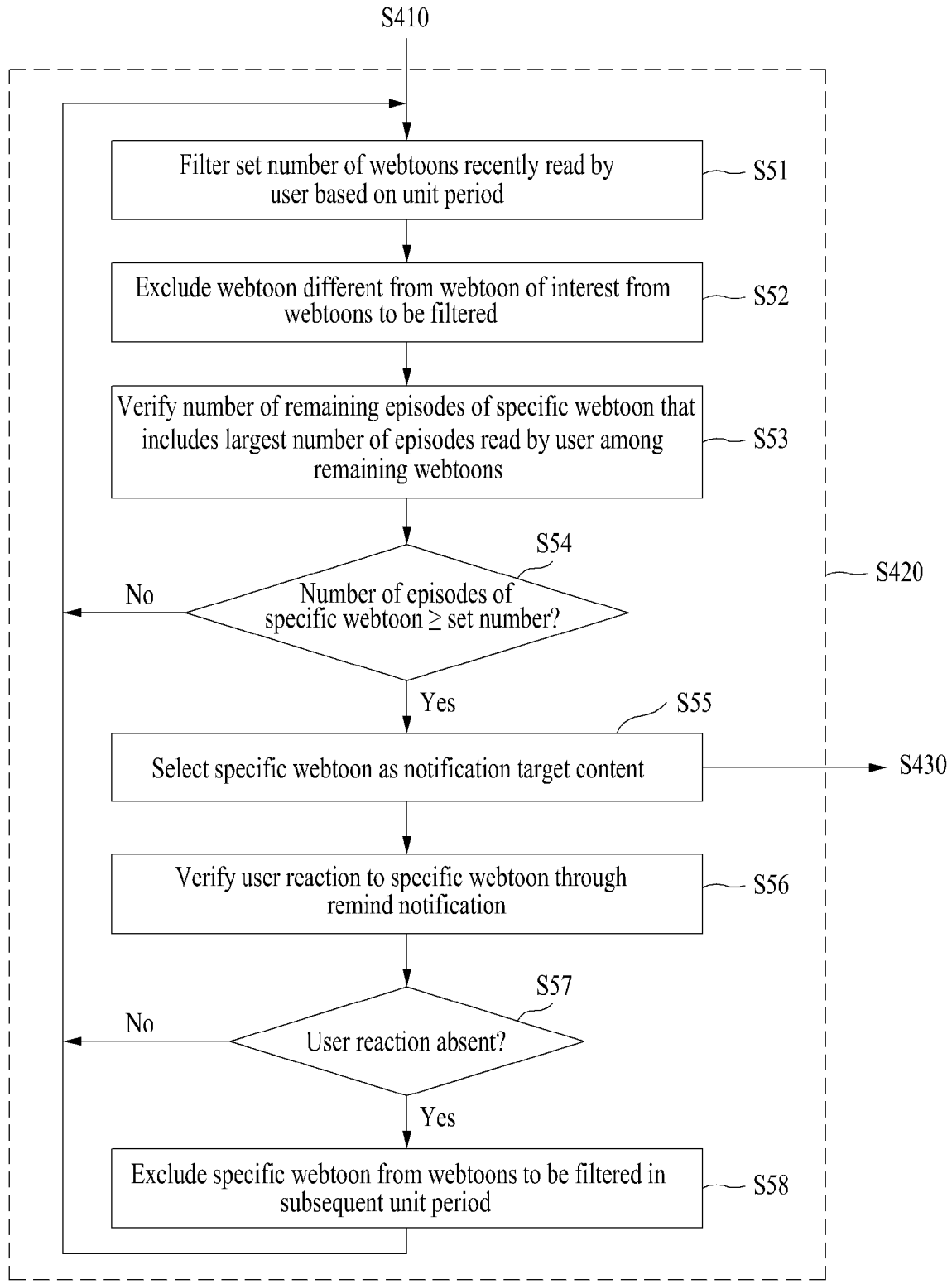
FIG. 5 is a flowchart illustrating an example of selecting notification target content for a remind notification according to at least one embodiment.

FIG. 5 is a flowchart illustrating an example of a method of selecting notification target content for a remind notification according to at least one embodiment. The content selection method of FIG. 5 corresponds to operation S420 of FIG. 4 and each of operations included in the content selection method may be performed at the selector 320 of FIG. 3. The operations included in the content selection method may not necessarily be performed in the illustrated order. Further, a portion of the operations may be omitted or an additional process may be further included.

In operation S51, the selector 320 filters, i.e., selects, a set number of webtoons recently read by a user based on a unit period. In other words, the selector 320 may filter the set number of webtoons recently read by the user during a specific amount of time per unit period. For example, the selector 320 may filter 40 webtoons in order from latest to oldest among webtoons read by the user during a predetermined amount of time defined by the scheduled daily update of the webtoons.

In operation S52, the selector 320 may exclude a webtoon set as a webtoon of interest of the user, a webtoon updated on a weekday different from a filtering point in time, etc., from webtoons to be filtered in operation S51. That is, the selector 320 may filter, as primary notification target content, a webtoon not registered as a webtoon of interest by the user and a webtoon updated during a corresponding unit period in order to perform filtering with respect to webtoons that the user has read without registering them as targets of interest, and has forgotten to read.

In operation S53, the selector 320 filters a specific webtoon that includes a largest number of episodes read by the user among remaining webtoons excluding a few webtoons from webtoons to be filtered, and determines the number of remaining episodes unread by the user with respect to the specific webtoon. Here, although description is made based on an example of filtering a webtoon that includes a largest number of episodes read by the user, it is provided as an example only. Other filtering criteria may be applicable. For example, an example of filtering a specific webtoon that includes a set number of episodes, for example, five episodes read by the user may be applicable.

In operation S54, the selector 320 determines whether a number of remaining episodes of the specific webtoon verified in operation S53 is greater than or equal to a set number, for example, 1.

If it is determined that the number of remaining episodes of the specific webtoon is greater than or equal to the set number in operation S54, the selector 320 selects the specific webtoon as notification target content in operation S55. For example, if a plurality of specific webtoons is present, that is, if the specific webtoons have the same priority based on a number of episodes read by the user, the selector 320 may select a webtoon of which a number of remaining episodes is smallest or less than or equal to the set number as the notification target content. As another example, if a plurality of specific webtoons is present and if a number of remaining episodes is identical for the plurality of specific webtoons, the selector 320 may select a webtoon most recently read by the user as the notification target content.

If it is determined that the number of remaining episodes of the specific webtoon is greater than or equal to the set number in operation S54, the selector 320 may determine that a reminder is required. Otherwise, the selector 320 may determine that the user is still reading the specific webtoon and a separate reminder is not required.

Accordingly, the selector 320 may select the notification target content by sequentially filtering each of webtoons recently read by the user based on the number of episodes read by the user, the number of remaining episodes unread after a last episode read by the user, and the last reading time. The selector 320 transfers information associated with the webtoon selected as the notification target content to the notification sender 330. The notification sender 330 may send a remind notification associated with the corresponding webtoon to the user.

Further, the selector 320 may determine whether to send the remind notification based on whether a user reaction to the webtoon selected as the notification target content is present.

In operation S56, the selector 320 verifies the user reaction to the webtoon selected as the notification target content through the remind notification. The notification sender 330 may send the remind notification and then store whether of launch associated with the any user reaction on the electronic device 110, associated with the remind notification. That is, if the user accesses the corresponding webtoon in response to the remind notification, the user reaction may be recorded. Using this, the selector 320 may check whether the user reaction to the webtoon selected as the notification target webtoon is present.

In operation S57, the selector 320 determines whether the user reaction is present after the remind notification to the webtoon selected as the notification target content is sent.

If it is determined that the user reaction is absent regardless of the remind notification associated with the webtoon selected as the notification target content in operation S57, the selector 320 may determine that the user has no interest and may exclude the corresponding webtoon from webtoons to be filtered in a subsequent unit period, so that reminding is not repeated in operation S58. Meanwhile, if the user accesses the corresponding webtoon through the remind notification, the selector 320 may include the corresponding webtoon in the webtoons to be filtered for the remind notification even in the subsequent unit period.

If a new webtoon enters a webtoon queue that includes webtoons recently read by the user during the above filtering process, it is possible to initialize a reaction check value for the user reaction any user reaction on the electronic device 110 associated with the remind notification may be checked and stored.

FIGS. 6 through 9 illustrate examples of a notification case according to at least one embodiment.

FIG. 6 illustrates an example of determining whether to send a remind notification based on check time 'Monday 00:00:00'. Herein, webtoons A, B, C, D, E, F, and G are assumed to be included in the recently read 40 episodes. The webtoon D registered as a webtoon of interest and the webtoon B of which an update day (i.e., a preset day of a period in which webtoon B is updated) is different from 'Monday' are excluded from the webtoons A, B, C, D, E, F, and G to be filtered. With respect to the webtoon A that includes the largest number of episodes read by the user among the remaining webtoons A, C, E, F, and G, the number of remaining episodes unread by the user is determined. If there is at least one remaining episode, the webtoon A may be set as notification target content.

FIG. 7 illustrates another example of determining whether to send a remind notification based on check time 'Monday 00:00:00'. Herein, webtoons A, B, C, D, E, F, and G are assumed to be included in the recently read 40 episodes. The webtoon B of which an update day is different from 'Monday' is excluded from the webtoons A, B, C, D, E, F, and G to be filtered. With respect to the webtoon A that includes the largest number of episodes read by the user among the remaining webtoons A, C, D, E, F, and G, the number of remaining episodes unread by the user is determined. If a remaining episode is absent, the webtoon A is excluded. With respect to each of the webtoon C and D that include the largest number of episodes read by the user among the remaining webtoons C, D, E, F, and G, the number of remaining episodes unread by the user is determined. Here, the webtoon D that includes the smallest number of remaining episodes may be selected as notification target content from the webtoons C and D. Accordingly, if webtoons have the same priority on the number of episodes read by the user, a webtoon that has the smallest number of episodes unread by the user may be selected as the notification target content.

FIG. 8 illustrates another example of determining whether to send a remind notification based on check time 'Monday 00:00:00'. Herein, webtoons A, B, C, D, E, F, and G are assumed to be included in the recently read 40 episodes. The webtoon B of which an update day is different from 'Monday' is excluded from the webtoons A, B, C, D, E, F, and G to be filtered. With respect to the webtoon A that has the largest number of episodes read by the user among the remaining webtoons A, C, D, E, F, and G, the number of remaining episodes unread by the user is determined. If a remaining episode is absent, the webtoon A is excluded. With respect to each of the webtoons C and D that has the largest number of episodes read by the user among the remaining webtoons C, D, E, F, and G, the number of remaining episodes unread by the user is determined. Here, if the number of remaining episodes is identical for each webtoon, the webtoon C that is most recently read by the user based on the last reading time may be selected as notification target content from the webtoons C and D. Accordingly, if webtoons have the same priority based on the number of episodes read by the user and the number of episodes unread by the user is identical, the webtoons may be compared based on the last reading time of the user, and the webtoon most recently read by the user may be selected as the notification target content.

FIG. 9 illustrates an example of determining whether to send a remind notification based on check time '+1 week Monday 00:00:00' (i.e., each Monday at 00 hour: 00 minute: 00 second). Herein, webtoons A, B, C, D, E, F, and G are assumed to be included in the recently read 40 episodes. The webtoon B of which an update day is different from 'Monday' is excluded from the webtoons A, B, C, D, E, F, and G to be filtered or selected. With respect to the webtoon A that includes the largest number of episodes read by the user among the remaining webtoons A, C, D, E, F, and G, the number of remaining episodes unread by the user is determined. If a remaining episode is absent, the webtoon A is excluded. With respect to the webtoon C among the remaining webtoons C, D, E, F, and G, if a user reaction to the remind notification associated with the webtoon C sent in the previous week is absent, the webtoon C is excluded. With respect to the webtoon D that includes the largest number of episodes read by the user among the remaining webtoons D, E, F, and G, the number of remaining episodes unread by the user is determined. If a remaining episode is present, the webtoon D may be selected as the notification target content.

Meanwhile, if the user reaction to the webtoon C, to which the remind notification was set last week, is present, the webtoon C may be included again in webtoons to be filtered a subsequent week and whether to send a remind notification may be determined. Here, the number of episodes of the webtoon C read by the user becomes six based on the user reaction. Thus, the webtoon F having the last reading time that is the oldest among the webtoons A, B, C, D, E, F, and G that are included in the 40 episodes recently read by the user last week, is excluded from a webtoon queue that includes webtoons recently read by the user.

Accordingly, to provide a remind notification with respect to a webtoon not separately registered as a webtoon of interest by the user, the selector 320 may analyze a user utilization record and may filter a webtoon that the user has read and recently forgotten to read.

Figure 10:
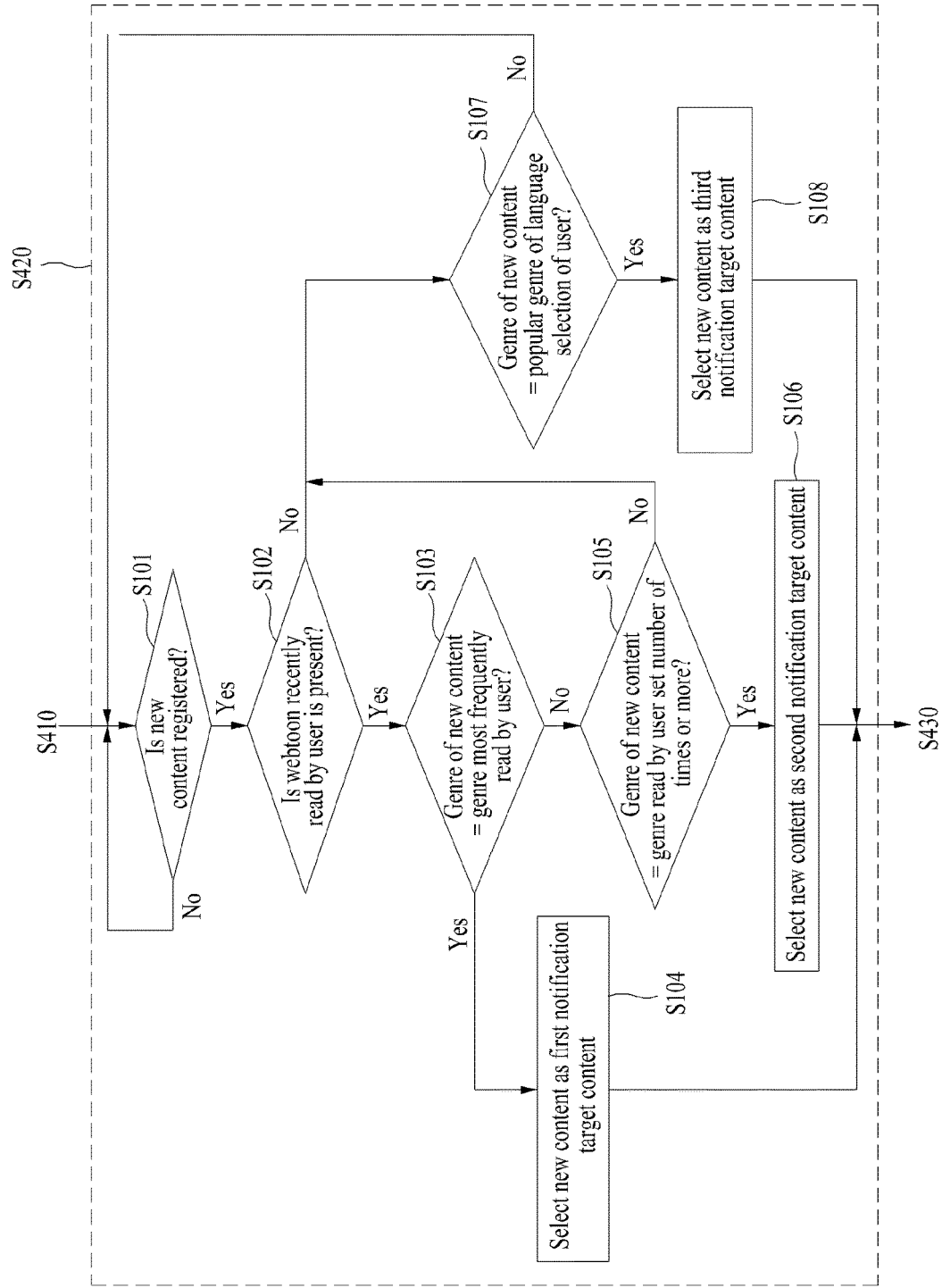
FIG. 10 is a flowchart illustrating an example of a method of selecting notification target content for a new content notification according to at least one embodiment.

FIG. 10 is a flowchart illustrating an example of a method of selecting notification target content for a new content notification according to at least one embodiment. The content selection method of FIG. 10 corresponds to operation S420 of FIG. 4, and each of operations included in the content selection method may be performed by the selector 320 of FIG. 3. The operations included in the content selection method may not necessarily be performed in the illustrated order. Further, a portion of the operations may be omitted or an additional process may be further included.

In the related art, a push notification associated with new content may be provided to all of users or a user having allowed a new content notification. However, herein, whether to send a push notification associated with the new content may be determined by analyzing a user utilization record.

In operation S101, the selector 320 determines whether new content is registered to send a push notification associated with the new content to the electronic device 110. During a new content registration process, preference classification information including genre information or category information needs to be registered for each piece of new content.

The selector 320 may trigger a new content notification per predetermined unit period or if the new content is determined to be registered in operation S101, and may determine whether a webtoon recently read by the user is present in operation S102. Alternatively, the selector 320 may determine whether the number of webtoons recently read by the user is greater than or equal to a set number. Here, the selector 320 may filter or select a desired (or, alternatively, predetermined) number of highest ranked webtoons based on the last reading time of the user from a webtoon queue that includes webtoons recently read by the user.

If the webtoon recently read by the user is determined to be present in operation S102, or if the number of webtoons recently read by the user is greater than or equal to the set number, the selector 320 counts the number of episodes of each of the webtoons read by the user for each genre, determines the genre most frequently read by the user, compares this genre to a genre of the new content, and determines whether the two genres are identical in operation S103.

If the genre of the new content is determined to be identical to the genre most frequently read by the user in operation S103, the selector 320 selects the new content as first notification target content in operation S104. That is, if a newly registered webtoon corresponds to a genre frequently read by the user, the selector 320 may select the newly registered webtoon as a preferred genre notification target that is the first notification target content. The selector 320 may also select new content of a genre identical to the preferred genre of the user as the preferred genre notification target based on the preferred genre registered in advance by the user.

If the genre of the new content is determined to be different from the genre most frequently read by the user in operation S103, the selector 320 determines a genre read by the user a set number of times or more, for example, twice or more, compares the verified genre to the genre of the new content, and determines whether the two genres are identical in operation S105.

If the genre of the new content is determined to be identical to the genre read by the user the set number of times or more in operation S105, the selector 320 selects the new content as second notification target content in operation S106. That is, if the newly registered webtoon does not correspond to the genre most frequently read by the user, however, corresponds to a genre of interest read by the user the set number of times or more, the selector 320 may select the new content as a genre-of-interest notification target that is the second notification target content.

If the webtoon recently read by the user is determined to be absent in operation S102, or if the number of webtoons recently read by the user is less than the set number, and if the genre of the new content is determined to be different from the genre read by the user the set number of times or more in operation S105, the selector 320 determines a genre popular in the language selection preset by the user, compares the popular genre to the genre of the new content, and determines whether the two genres are identical in operation S107.

If the genre of the new content is determined to be different from the popular genre of the language selection of the user in operation S107, the process goes back to operation S101. Otherwise, the selector 320 selects the new content as third notification target content in operation S108. That is, if the newly registered webtoon corresponds to none of the genre most frequently read by the user and the genre read by the user the set number of times and corresponds to the most popular genre for each language group, the selector 320 may select the new content as a popular genre notification target that is the third notification target content.

The selector 320 may transfer information associated with new contents that are selected as the first to third notification target contents to the notification sender 330. The notification sender 330 may send a notification associated with the corresponding new content to the user. Here, the notification sender 330 may provide a push notification of a different message type based on the type of notification target content, for example, the preferred genre notification target, the genre-of-interest notification target, and the popular genre notification target.

The selector 320 may collect a user reaction for each genre through a new content notification and may use the collected user reaction to determine whether to send the new content notification. For example, if a user response to the new content notification is absent or the number of responses is at or below the set level considered to be significant, the selector 320 may manage a genre of corresponding content as a genre non-preferred by the user and may exclude the corresponding content from the new content notification target.

Figure 11:
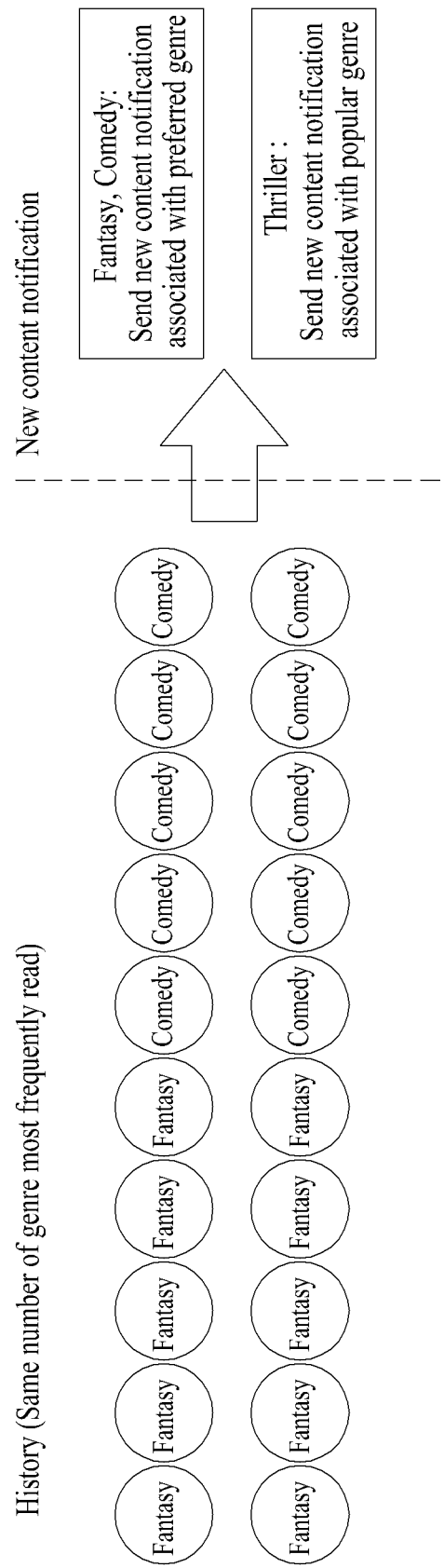
FIGS. 11 and 12 illustrate examples of a notification case based on a number of episodes for each genre according to at least one embodiment.
Figure 12:
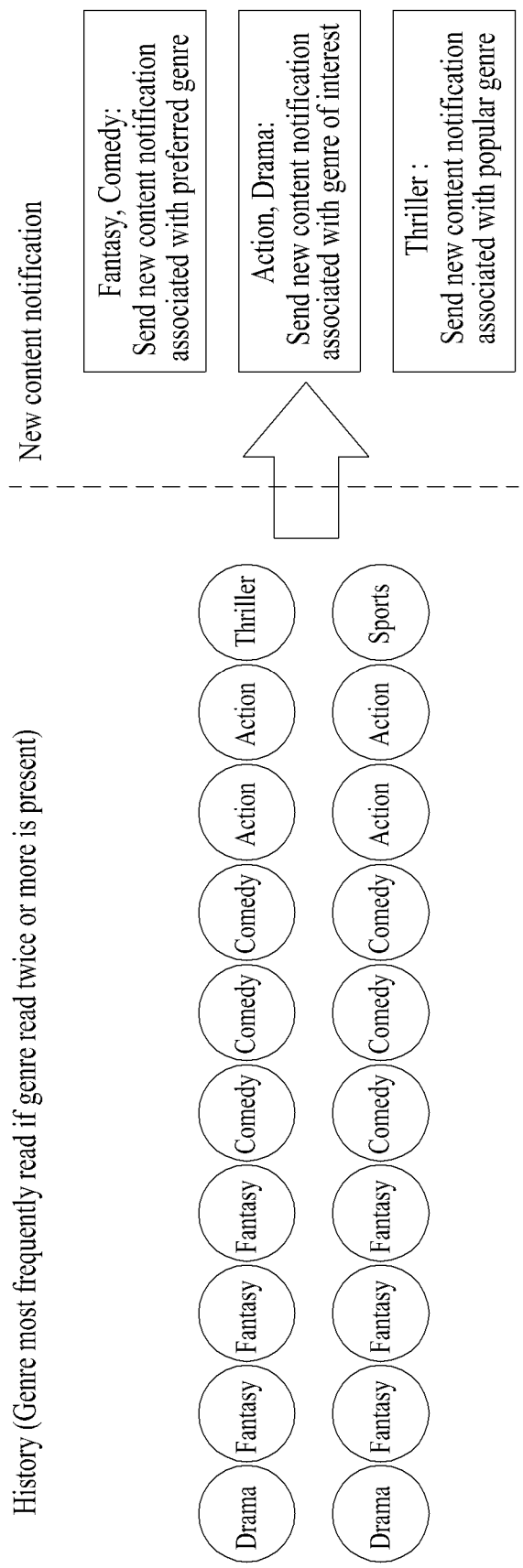

FIGS. 11 and 12 illustrate examples of a notification case based on a number of episodes for each genre according to at least one embodiment.

Referring to FIG. 11, if the genres of webtoons that include 20 episodes recently read by a user are 'Fantasy' and 'Comedy', and each of 'Fantasy' and 'Comedy' includes the same number of episodes, for example, 10 episodes, a new content notification associated with a preferred genre may be sent with respect to new contents, for example, the new webtoons 'Fantasy' and 'Comedy'. Here, if the language selection of the user is set as Thai language and the most popular genre in a corresponding language group is 'Thriller', a new content notification associated with a popular genre may be set with respect to the new content associated with the genre 'Thriller'.

Referring to FIG. 12, based on the assumption that a genre read by the user twice or more is determined as a genre of interest, a new content notification associated with a preferred genre may be sent with respect to new contents, for example, the new webtoons 'Fantasy' and 'Comedy' each including the largest number of episodes most frequently read by the user, for example, six episodes. Also, if a corresponding genre does not correspond to 'Fantasy' and 'Comedy', but does correspond to genres of interest, for example, 'Action' and 'Drama', read by the user twice or more, a new content notification associated with a genre of interest may be sent with respect to new contents associated with the genre 'Action' and 'Drama'. Similarly, the new content notification with the popular genre may be sent with respect to new content associated with the most popular genre 'Thriller' in the language group using the language selection, 'Thai language', of the user.

FIG. 13 illustrates examples of a notification message type according to at least one embodiment.

A remind notification 1301 is a notification about content, for example, a webtoon, that a user has read and has recently forgotten to read, and, for example, may be created as a message template in a form of 'Love {content name}. Update!'. Here, a content name may include a webtoon name.

A new content notification associated with preferred genre 1302 is a notification about new content of a genre recently most frequently read by the user, and, for example, may be created as a message template in a form of 'New content for {genre name} mania! {content name}!'.

A new content notification associated with genre of interest 1303 is a notification about new content of a genre the user has an interest in, for example, a genre read by the user twice or more, and, for example, may be created as a message template in a form of 'New content to be checked if you are interested in {genre name}! {content name}!'.

A new content notification associated with popular genre 1304 is a notification about new content popular in a language group of the user, and for example, may be created as a message template in a form of 'Hot {genre name} new content in China! {content name}!'.

If two or more new contents are new content notification targets, the corresponding new contents may be created in a message template in a form of 'Please do not miss {number} new contents aside from {genre name} new content, {content name}!'.

The notification message may be created in a text type in which a title and at least a portion of a main body are exposed or in an image type in which an image, for example, a thumbnail, a representative image, etc., associated with content is exposed.

The notification messages of FIG. 13 may be displayed on a screen of the electronic device 110 under control of the application installed on the electronic device 110. In response to a user selection on the notification message, the user may connect to a detailed page of corresponding content along a path ('slide to view') included in the notification message.

Figure 14:
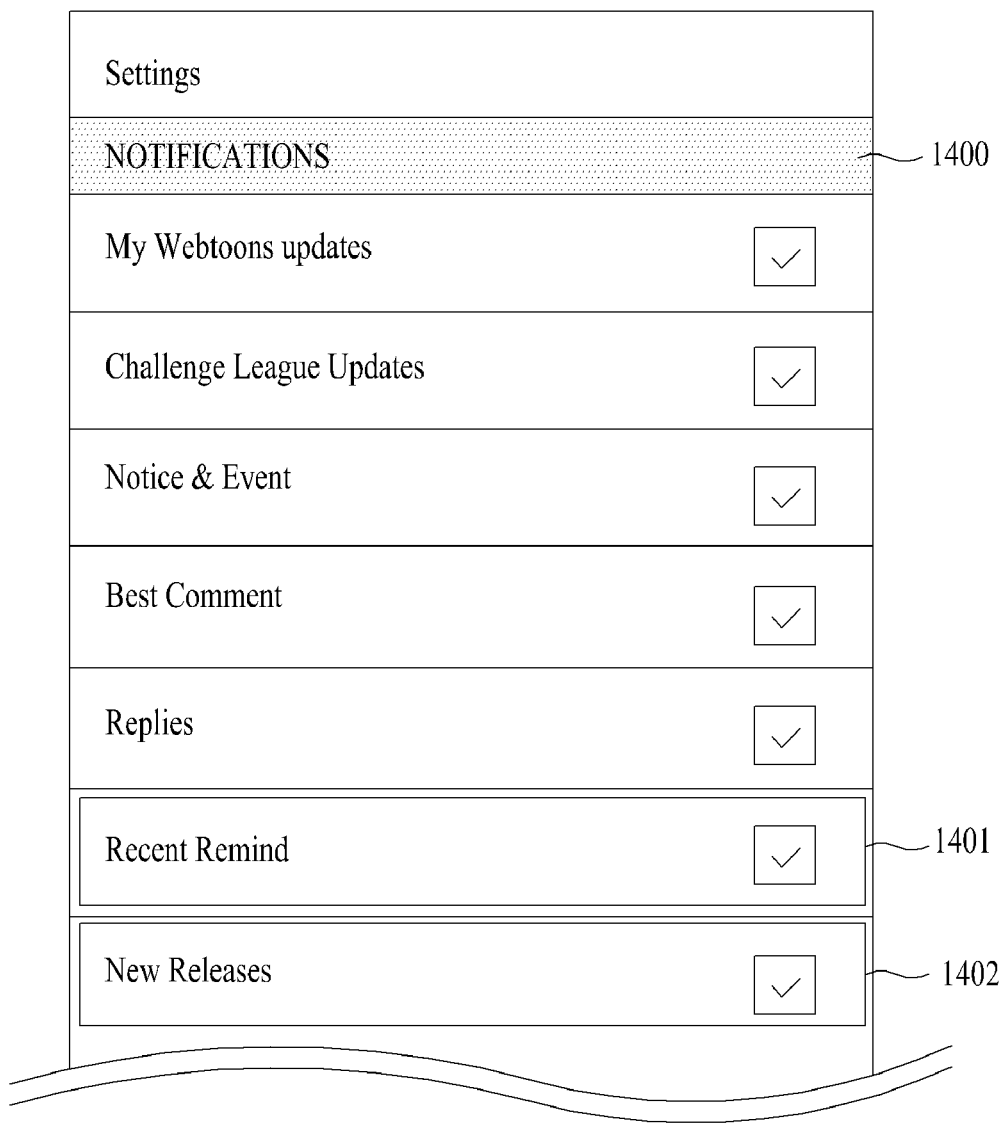
FIG. 14 illustrates an example of a setting screen for a notification according to at least one embodiment.

The server 150 may provide a user setting environment with respect to a personalized notification and may provide a push notification associated with notification target content based on a user setting. For example, referring to FIG. 14, a setting screen on the electronic device 110 associated with a content service may include a 'NOTIFICATIONS' menu 1400 for user settings associated with the push notification. The 'NOTIFICATIONS' menu 1400 may include a 'Recent Remind' menu 1401 for a user setting associated with a remind notification and a 'New Releases' menu 1402 for a user setting associated with a new content notification. The user may set whether to receive the remind notification and the new content notification as a personalized notification through the 'Recent Remind' menu 1401 and the 'New Releases' menu 1402, respectively.

Herein, since a personalized notification is provided to a user by analyzing a personal history of contents within a content service consumed by the user, the remind notification may be provided with respect to a webtoon that the user has read and has recently forgotten to read. Further, a new content notification may be provided with respect to new content of a genre recently most frequently read by the user, new content of a genre recently preferred by the user, new content of a genre popular in a language group of the user, and the like.

Herein, it is described that the server 150 configured as a client-server environment provides a personalized notification by analyzing a user utilization record based on a user setting within a content service. However, it is provided as an example only and features associated with the example embodiments may be configured in an application form installed on the electronic device 110 so that the electronic device 110 may provide the personalized notification by analyzing the user utilization record directly.

According to some example embodiments, it is possible to enhance user accessibility to content and to reduce resources or processing cost used for providing content by analyzing a user utilization record of the content and by automatically providing the content desired by the user through a personalized push notification. Also, according to some example embodiments, since a remind notification is provided to a user for content that the user has recently forgotten to read among contents being used by the user such that the user may directly enter, that is, connect to the corresponding content, it is possible to activate the user influx and the content consumption by reminding the user of the user's interest in the content. Also, according to some example embodiments, it is possible to effectively provide a content notification to users having a relatively high actual consumption probability by providing an automatic push notification based on a user preference or a language selection with respect to new content.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A notification providing method executed by a computer, the method comprising:
    filtering a plurality of specific contents recently consumed by a user based on a predetermined unit time period, each of the specific contents having a plurality of episodes;
    determining a number of episodes read by the user within each of the plurality of specific contents;
    determining a number of remaining episodes unread by the user in each of the plurality of specific contents;
    selecting, from among the plurality of specific contents, specific content with a largest number of episodes read by the user relative to others of the plurality of specific contents as the notification target content in response to the number of remaining episodes unread by the user in the specific content being greater than or equal to a second predetermined number; and
    sending a push notification associated with the notification target content to the user as a personalized notification,
    wherein the selecting of the specific content excludes selection of content updated on a different time period from the predetermined unit time period or not updated during the predetermined unit time period.

2. The method of claim 1, wherein the selecting comprises selecting the specific content that includes a smallest number of the number of remaining episodes from among the plurality of specific contents as the notification target content.

3. The method of claim 1, wherein the selecting comprises selecting as the notification target content, the specific content most recently read by the user from among the plurality of specific contents when the number of remaining episodes is identical for all of the specific contents.

4. The method of claim 1, wherein the selecting comprises excluding specific content registered by the user as a target of interest.

5. The method of claim 1, wherein the sending comprises sending a remind notification associated with the specific content selected as the notification target content, and
    the selecting further comprises:
    verifying a user reaction to the specific content after the remind notification is sent; and
    excluding the specific content from among contents to be filtered in a subsequent unit period, in response to an absence of the user reaction.

6. The method of claim 1, wherein the sending comprises classifying a message type based on the notification target content, and sending the push notification in a form of the message type corresponding to the notification target content.

7. The method of claim 6, wherein each of a remind notification associated with specific content of which consumption of the user is stopped and a new content notification associated with newly registered content are different message types.

8. The method of claim 6, wherein each of a new content notification associated with a preferred genre of the user as a new content notification associated with newly registered content, a new content notification associated with a genre of interest of the user, and a new content notification of a popular genre in a language group of the user are different message types.

9. A non-transitory computer-readable recording medium storing a computer program to implement a notification providing method in conjunction with an electronic device configured as a computer, wherein the notification providing method comprises:
    filtering a plurality of specific contents recently consumed by a user based on a predetermined unit time period, each of the specific contents having a plurality of episodes;
    determining a number of episodes read by the user within each of the plurality of specific contents;
    determining a number of remaining episodes unread by the user in each of the plurality of specific contents;
    selecting, from among the plurality of specific contents, specific content with a largest number of episodes read by the user relative to others of the plurality of specific contents as the notification target content in response to the number of remaining episodes unread by the user in the specific content being greater than or equal to a second predetermined number; and
    sending a push notification associated with the notification target content to the user as a personalized notification,
    wherein the selecting of the specific content excludes selection of content updated on a different time period from the predetermined unit time period or not updated during the predetermined unit time period.

10. A notification providing system configured as a computer, the notification providing system comprising:

a processor having a plurality of functional units each performing a corresponding predefined operation, the functional unit including:

a selector configured to filter a plurality of specific contents recently consumed by a user based on a predetermined unit time period, each of the specific contents having a plurality of episodes;

determine a number of episodes read by the user within each of the plurality of specific contents;

determine a number of remaining episodes unread by the user in each of the plurality of specific contents;

select, from among the plurality of specific contents, specific content with a largest number of episodes read by the user relative to others of the plurality of specific contents as the notification target content in response to the number of remaining episodes unread by the user in the specific content being greater than or equal to a second predetermined number; and a notification sender configured to send a push notification associated with the notification target content to the user as a personalized notification, wherein the selecting of the specific content excludes selection of content updated on a different time period from the predetermined unit time period or not updated during the predetermined unit time period.

11. The notification providing system of claim 10, wherein the selector is further configured to select specific content that includes a smallest number of the number of remaining episodes from among the plurality of specific contents as the notification target content, and select content most recently read by the user among the plurality of specific contents as the notification target content when the number of remaining episodes is identical for all of the specific contents.

\* \* \* \* \*